May 12, 1970     A. N. MICHIE     3,511,416
METERING SPOUT

Filed Jan. 31, 1968     4 Sheets-Sheet 1

INVENTOR
ALETHEA N. MICHIE

BY Pennie, Edmonds, Morton, Taylor & Adams
ATTORNEYS

May 12, 1970     A. N. MICHIE     3,511,416
METERING SPOUT
Filed Jan. 31, 1968     4 Sheets-Sheet 2
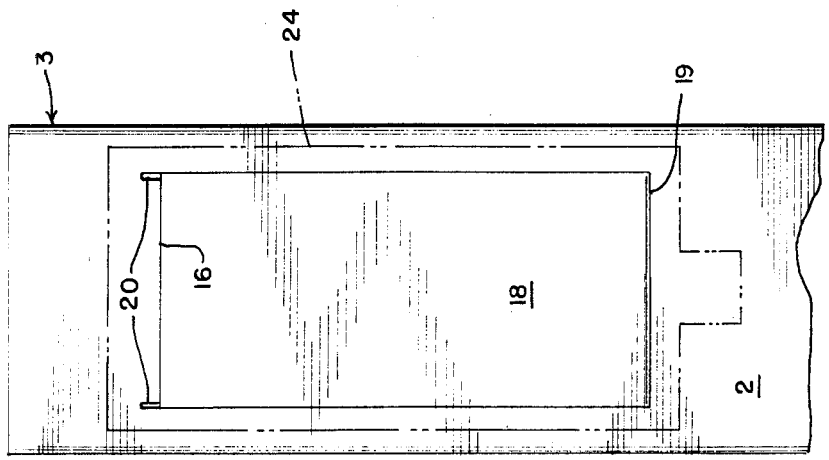
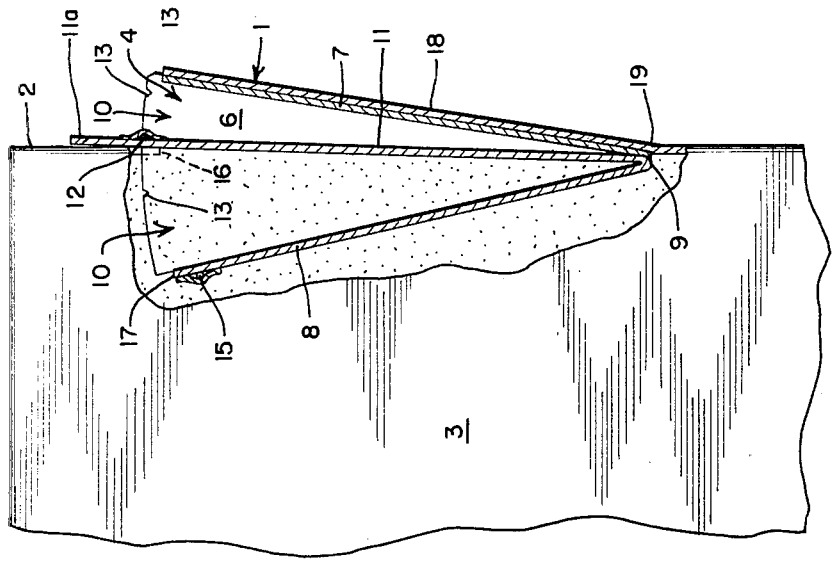
INVENTOR
ALETHEA N. MICHIE
BY
ATTORNEYS

INVENTOR
ALETHEA N. MICHIE

ATTORNEYS

United States Patent Office 3,511,416
Patented May 12, 1970

---

3,511,416
METERING SPOUT
Alethea N. Michie, 166 E. 96th St.,
New York, N.Y. 10028
Filed Jan. 31, 1968, Ser. No. 702,081
Int. Cl. G01f 11/00
U.S. Cl. 222—305                  11 Claims

ABSTRACT OF THE DISCLOSURE

A metering spout is provided for a container of a free-flowing particulate solid, for metering out a pre-determined quantity of the contents of the container. The metering spout, which is integral with the container may be preset to meter out any desired quantity of the contents. To meter out a given quantity, the metering spout is adjusted to that quantity and the container is tilted to permit its contents to fill the spout from within the container. The metering spout is then moved to an open position in which the container is sealed against leakage through the spout and in which the metered quantity in the spout may be conveniently discharged exteriorly of the container.

BACKGROUND OF THE INVENTION

Field of the invention

This invention relates to metering devices, and more particularly to a metering spout for free-flowing particulate solids. A free-flowing particulate solid as used herein is any solid substance capable of flowing freely enough to be metered by the metering spout disclosed herein.

The prior art

While it is common for containers of particulate solids to have built-in pouring spouts of one sort or another, few if any of such containers are equipped with spouts capable of metering out a predetermined quantity of such solids. Moreover, no container for particulate solids is known to the applicant which has a spout capable of being preset to meter out different quantities of such solids, depending on the particular amount desired.

Metering spouts are known which are capable of metering out a particular fixed quantity of particulate solids. Such spouts are shown for example in Pat. No. 3,036,742 to Wagoner et al. and Pat. No. 3,187,961 to G. A. Moore. The former is capable of being used to obtain different quantities of the contents of the container in which is is mounted. This may be achieved, according to the patent, by filling the spout with the desired quantity, as determined visually by an index line on the spout, and then pouring out the contents of the spout through a second opening in the wall of the spout. The accuracy of this measurement is obviously dependant upon the care exercised in filling the spout.

The absence from common usage, particularly household use, of a metering spout presettable to a predetermined desired amount is surprising, especially in view of the very substantial competition among manufacturers of many solid particulate products in common household use. Detergents and soap powders, for example, are used in proportion to the volume and kind of cleaning to be done; a container having an adjustable metering spout capable of reliable operation and inexpensive manufacture would be of significant competitive advantage. To take another example, the combination of a presettable metering spout with a container for instant-type particulate food mixes, or with containers for condiments or seasonings, would greatly facilitate following instructions or recipes. In many instances such products must be metered out with substantial accuracy, particularly in the case of instant mixes which gel or harden, in order to achieve the proper consistency in the end product.

SUMMARY OF THE INVENTION

In accordance with the present invention, an adjustable metering spout is provided for use with a container for particulate solids, which is capable of being preset to accurately and automatically meter out a desired quantity of such solids. The spout, which is integral with the container, the contents of which are to be metered out, comprises a variable-volume body having an opening at its top and normally disposed at least partially within the container so as to be fillable through the opening with the contents of the container merely by tilting or shaking the latter. The variable-volume body is movable to an open position substantially exteriorly of the container in which position the contents remaining in the container are sealed against leakage through the spout, and in which the contents which have been placed in the variable-volume body may be discharged exteriorly of the container through the opening. The effective volume of the variable-volume body, which is that volume into which the material in the container is permitted to flow when the variable-volume body is filled, is varied by means of a movable divider which forms a wall of the body and which extends through the opening therein to coact with a wall of the container for limiting the volume of the variable-volume body which can be disposed within the container to the desired effective volume. The apparatus disclosed herein is of particular use in metering or dispensing preselected quantities of packaged household goods such as soap powder and detergents, salt and other condiments, and other products similarly packaged in disposable containers, because it can be inexpensively produced compatibly with the construction, in general, of such container.

DESCRIPTION OF THE DRAWINGS

Particular embodiments of the invention will be described with respect to the accompanying drawings, in which:

FIG. 2 is a side view, partially cut away of the container and spout of FIG. 1, in which the spout is disposed to receive a predetermined quantity of the contents of the container;

FIG. 3 is a partial front elevational view of the embodiment of FIGS. 1 and 2 showing the container wall;

DETAILED DESCRIPTION OF PREFERRED EMBODIMENTS

Figure 1:
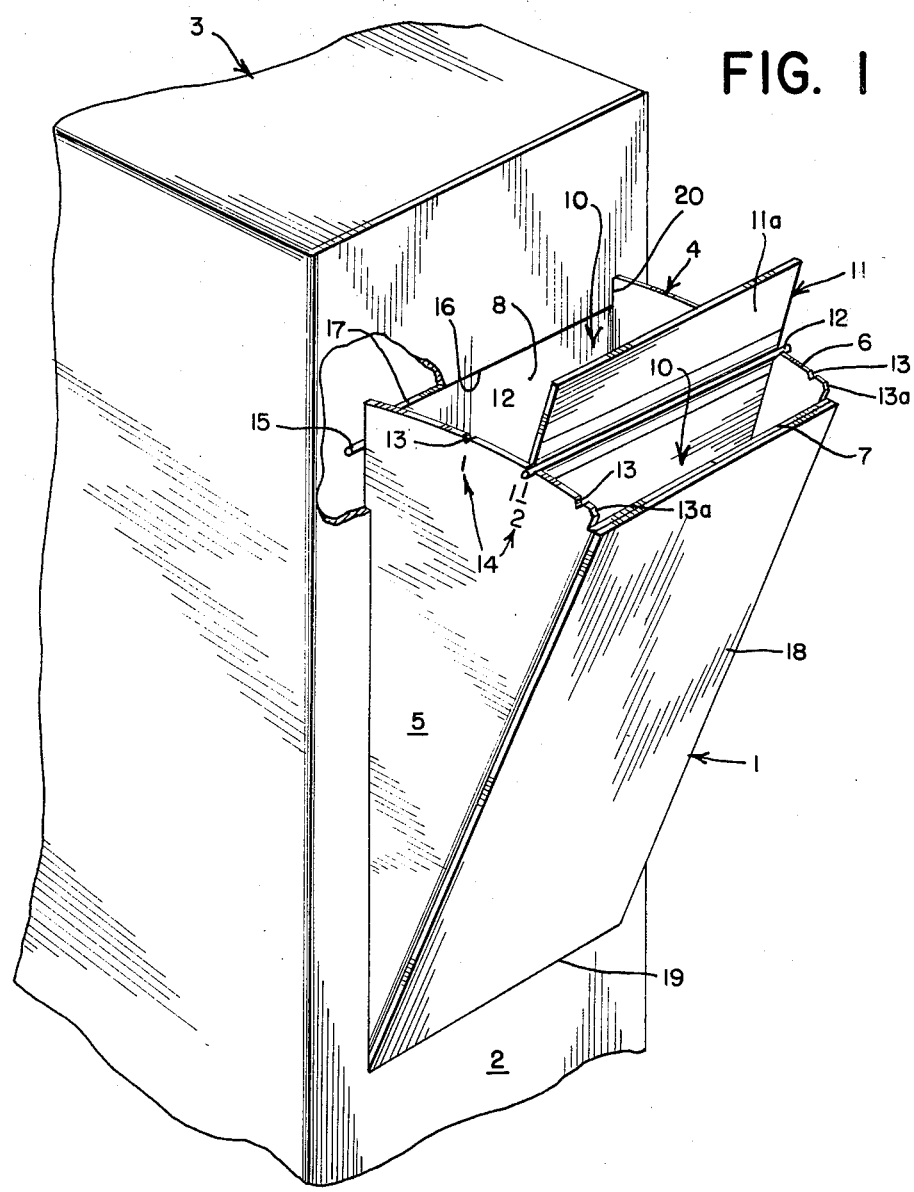
FIG. 1 is a perspective view of the side of a container provided with a metering spout according to the invention in which the spout is fully open.

As shown in FIGS. 1 and 2, the metering spout 1 of the invention is mounted on a wall 2 of a container 3 for particulate free-flowing solids. The metering spout should preferably be located relatively high up on the container wall, at the same time leaving enough clearance between the top of the spout and the top of the container to permit the contents of the latter to flow readily into the spout when the container is tilted or shaken. If the spout is located too low on the container wall, difficulty will be encountered in closing the spout due to the greater density of the contents deeper in the container.

The metering spout comprises a variable-volume body 4 having sides 5, 6 and front and rear panels 7 and 8, respectively, the latter panels having a common edge 9 forming the bottom of the body. The body may be of any desired shape, but the V-saped body shown minimizes the resistance of the material in the container to movement of the spout. Variable-volume body 4 has an opening 10 at its top such that it can communicate both with the interior of the container and exteriorly of it, depending on the position of the spout.

An additional wall of the variable-volume body is formed by a movable divider 11 joined to the body at its lower edge 9, extending upwardly contiguously with the sides 5 and 6 of the body and protruding through the opening 10 therein.

The effective volume of variable-volume body 4 is that volume bounded by rear wall 8, divider 11, and the intervening portions of sides 5 and 6. It is the effective volume of body 4 into which the contents are transferred from the container, and from which such transferred contents are subsequently discharged.

To operate the spout, the effective volume of the variable-volume body is adjusted to be equal to the volume which it is desired to meter out of the container. For this purpose, divider 11 is provided with laterally extending pins 12 disposed to engage notches 13 in the top edges of sides 5 and 6. Pins 12, which may be constituted by the ends of a single rod attached to the divider, by engaging in corresponding notches 13, lock the divider in preselected positions, each of which corresponds to and determines a particular effective volume of the body 4. A pair of notches 13a adjacent front panel 7 is provided to position divider 11 for closure of the spout. Calibration markings 14 corresponding to each opposite pair of notches 13 may indicate the particular effective volume to which they correspond. Alternatively, different calibration or scale markings may be used; for example the scale on a container of a diet food or food concentrate may be calibrated directly in terms of the caloric content of the amounts to be metered out.

In operation, the divider 11 is set so that pins 12 engage notches 13 corresponding to the quantity desired to be metered out, and the variable-volume body is displaced inwardly of the container as far as it is permitted to go by that portion 11a of divider 11 which extends through opening 10. Divider 11 thereby coacts with the container wall to limit the volume of body 4 available to receive the container contents to the effective volume of the body, at the same time sealing the container against spillage etxernally of the spout. The container is then tilted and/or shaken to fill the portion of the variable-volume body within the container, and the body is subsequently pulled out to its full extent, permitting the desired quantity of material, which is automatically retained in the body, to be poured out.

The outward travel of body 4 is limited by pins 15, which may be identical to pins 12, and which retain the back wall 8 of the body within the container. Pins 15, which may be made of any material, should be thin enough to pass readily through the material in the container and yet rigid enough to retain the body in the container.

The container wall 2 extends downwardly into opening 10 to form an edge 16 for leveling the contents of body 4 as the spout is pulled to its exterior or open position; this level should be below the level of notches 13 so that when the body is full and the spout open, the contents cannot spill out through the notches.

It is important for most purposes that the top edge 17 of rear wall 8 of the body be contiguous, when the spout is open, with edge 16, and that the two edges not overlap. Such overlap would serve as a trap for material in the container, preventing complete opening of the spout and thereby leading to inaccurate metering, since material in the spout could spill back into the container and vice versa.

Figure 4:
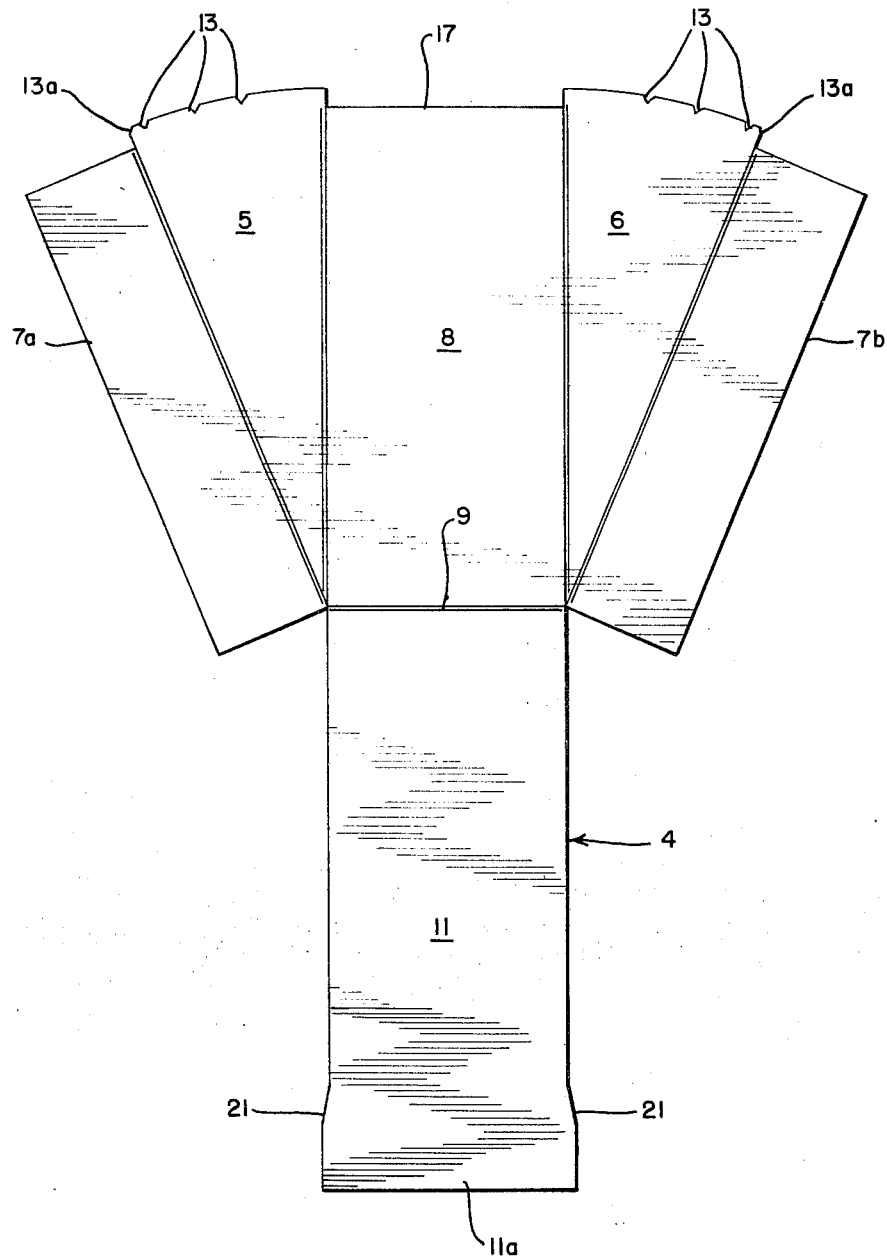
FIG. 4 is a plan view of a blank formed of sheet material prior to assembly into a metering spout.

Construction of a metering spout in accordance with the invention is illustrated in FIG. 4, showing a blank which has been die-cut from a sheath of material and is ready for assembly with a container. Preparation of the container for such assembly is illustrated in FIG. 3, in which container wall 2 has been cut out to form a panel 18 hinged to the container at its bottom edge 19. Slots 20, equal in width to the thickness of side panels 5 and 6 of the body 4, are cut out of container wall 2 to permit the top portions of the side panels to extend further upward than edge 16.

Variable-volume body 4 may be cut in a single piece, as shown in FIG. 4, and may be made of any material compatible with the particular type of container to be used and the material to be contained in it. The body is formed of rear panel 8, side panels 5 and 6 and front panel segments 7a and 7b, to be joined together at their outer edges in assembling the body. Panel 8 extends to form divider 11, the end 11a of which widens to form tapering shoulders 21 for cooperating with notches 13 to preset the variable-volume body to the desired effective volume. The curves defined by the upper edges of side panels 5 and 6 are circular arcs about hinge edge 9.

The variable-volume body is assembled and fastened to the container by bending up divider panel 11, bending side panels 5 and 6 around parallel to each other, and bending over front panel segments 7a and 7b so that their outside edges are contiguous; the front panel 7 is then glued or otherwise fastened securely to container panel 18, as indicated in FIG. 1 such that side panels 5 and 6 abut the edges of the container wall from which panel 18 has been cut. All points of bending are preferably prescored. Panels 7 and 8 are the same width as container panel 18.

The variable-volume body may be formed of any suitable material; for use with cardboard or paper containers, it may be made of the same material as the containers themselves. Alternate suitable materials include fiber board, most plastics, for example polyethylene, polypropylene, acrylic, polyacetate and polystyrene, and metals. Any material is suitable which is sufficiently rigid and resistant to warping and deterioration with repeated use, and which is inexpensive and capable of being formed into the desired shape.

In the case of a body 4 made of plastic, the body may be molded in a single piece, with a flexible integral plastic hinge connecting the divider 11 in the body. Alternatively, the body may be made in two or more pieces, one of which is the divider, and the latter may be hinged in the body by short tabs or protrusions (not shown) extending from its sides to cooperate with indentations (not shown) in walls 5 and 6 at the hinge point (edge 9). Similarly, if body 4 is made of a plastic, notches 13 may be replaced by indentations in walls 5 and 6 for cooperating with pins 12. Any other complementary retaining means or patterns may be provided on the body side panels and divider 11 which are capable of retaining the divider in preset positions. A variable-volume body molded of plastic is particularly suitable for mounting in a container having curved walls, so that the front wall of the spout can conform to the container wall. In such case, the spout must lie transverse to the container, its hinge edge lying parallel to the cylindrical axis of the container. Alternatively, a flat panel may be provided in the container wall for mounting the spout, or the spout may be located in a flat end wall of the container.

Figure 5:
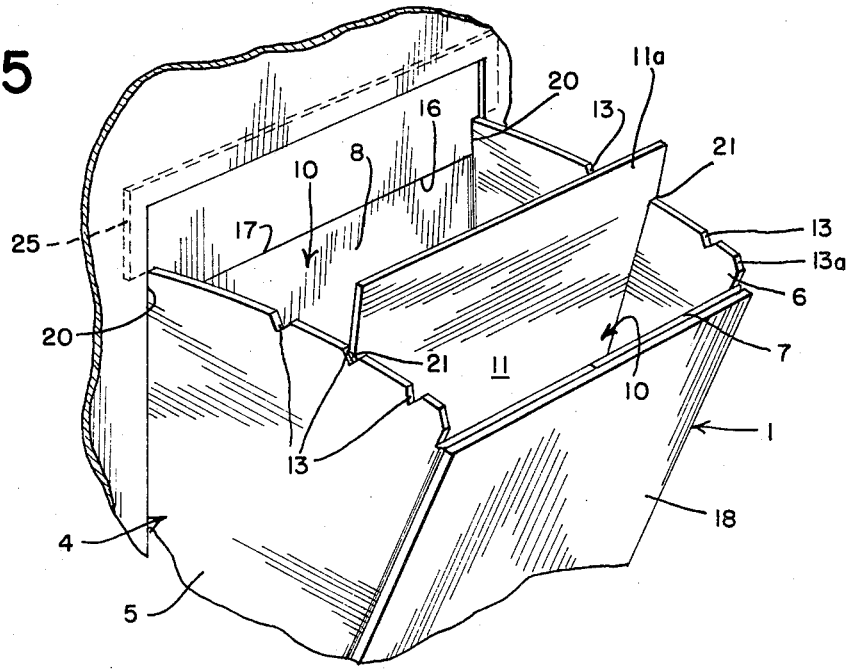
FIG. 5 is a detail view illustrating a particular embodiment of the invention.

FIGS. 4 and 5 illustrate an embodiment of the invention which is particularly suitable where it is desired to vary the effective volume of body 4 over a continuous range, rather than at discrete intervals. The edge of divider 11 in FIGS. 4 and 5 contains a shoulder 21 which tapers outwardly to a wider portion 11a of the divider. Tapered shoulder 21 facilitates engagement and disengagement of the divider with walls 5 and 6 of body 4. A continuously variable effective volume may be obtained by continuously notching the tops of the sides, if the body is made of cardboard or heavy paper or, if the body is plastic, by molding the equivalent portion to be similarly ridged. This form of the divider is also particularly effective in conjunction with discretely notched side panels, in minimizing wear and warping of the spout with use.

The body 4 may be fastened to the container by gluing, cementing, stapling or any other convenient means. If body 4 is made of a thermoplastic material, a thermoplastic resin adhesive may conveniently be applied to the surface of container panel 18 and the body fastened thereto by the application of heat and presure adequate to bond the two together.

A second orifice may be provided in the container for the purpose of dispensing non-metered amounts, and should be closed when the metering spout is used.

Ordinarily, sufficient friction will exist between the metering spout and the container to prevent the spout from opening accidentally. For particularly dense material, it may be desirable ot attach a conventional closure device to the spout for maintaining it closed against the weight of the material in the container. When initially sold, the container should normally have a breakable seal 24 (indicated in phantom lines in FIG. 3) for maintaining the spout closed, which may be broken upon initial use.

In a particularly advantageous embodiment of the invention, the metering spout described herein is placed in the top of the container (as used herein, the term "side" refers to any wall of the container including the top and bottom), thereby taking advantage of the the double wall thickness usually present at the top. This renders the container particularly resistant to warping and bending of the container side wall adjacent to the spout through repeated use.

It will be noted that in the embodiment described, the front panel 18 of the spout necessarily lies above the level of the container wall due to the extension of divider 11, particularly the portion 11a thereof, beyond top edge 16 of the container wall. This feature can be used to advantage in marketing the device, for example by utilizing divider portion 11a for advertising. If, however, it is desired to market the container in such form that all container walls are smooth and uninterrupted, the portion of container wall 2 lying above the spout may be cut back, leaving the lower edge of the container wall above the spout flush with the top edge of divider portion 11a. In this case, an additional panel 25 is glued or otherwise secured to the inside of the container wall such that it extends into the spout to form edge 16; the indentation thereby created in the container wall permits substantially complete closure of the spout, leaving a smooth continuous surface.

It will be apparent to those skilled in the art that various modifications may be made of the particular embodiments shown and described herein without departing from the scope and spirit of the invention.

I claim:

1. In combination with a container for a free-flowing particulate solid, the improvement comprising a metering spout integral with such container for metering out a preset quantity of said particulate solid, said metering spout comprising:

a variable-volume body comprising fixed front, rear and side panels and having an open top and mounted in a wall of such container, normally disposed at least partially within the container so as to be fillable through said open top with the contents of the container and movable to an open position substantially exteriorly thereof in which position the contents remaining in the container are sealed in the container and the contents which have been placed in the variable-volume body may be discharged exteriorly of the container through said open top; and a movable divider mounted within the body for varying the effective volume of the body to be equal to such preset quantity.

2. In combination with a container for a free-flowing particulate solid, the improvement comprising a metering spout integral with such container for metering out a preset quantity of said particulate solid, said metering spout comprising:

a variable-volume body comprising fixed front, rear, and side panels and having an open top and mounted in a wall of such container, normally, disposed at least partially within the container so as to be fillable through said open top with the contents of the container and movable to an open position substantially exteriorly thereof in which position the contents remaining in the container are sealed in the container and the contents which have been placed in the variable-volume body may be discharged exteriorly of the container through said open top;

a movable divider mounted within the body for varying the effective volume of the body to be equal to such preset quantity, said movable divider extending through the opening of said body to coact with said wall of the container for limiting the volume of said body which can be disposed within the container to said effective volume.

3. A metering spout as defined in claim 2 wherein said variable-volume body is mounted in a window in said container wall and comprises front and rear panels and side panels, the upper edge of said rear panel being contiguous with the upper edge of said window when the variable-volume body is in its open position.

4. A metering spout as defined in claim 3 wherein said window is the opening formed by removing the rectangular portion of the container wall on three sides thereof to form a movable panel attached to the container wall at its bottom edge, said bottom edge acting as a hinge, and the variable-volume body is attached to said panel so as to be able to move between a closed position in which said body is substantially entirely within the container, and said open position.

5. A metering spout as defined in claim 4 wherein the bottoms of said front and rear panels form a common edge adjacent said hinge, said movable divider being mounted for movement substantially about said bottom edge.

6. A metering spout as defined in claim 5 wherein said movable divider and the top portions of said side panels include retaining means for cooperating to retain said divider in preset positions corresponding to predetermined effective volumes.

7. A metering spout as defined in claim 6 wherein said cooperating retaining means include notches formed opposite one another on the top portions of said side panels, and complimentary outwardly tapering segments formed by the sides of the movable divider adjacent said notches.

8. A metering spout as defined in claim 7 wherein the upper edges of said side panels define substantially circular arcs about said hinge, said notches extending downward a distance such that they are above the level of the contents of the body, which level is determined by the upper edge of said window, during a metering operation.

9. A variable-volume body for use in combination with a container for free-flowing particulate solids as a metering spout for such container, such container having a window formed in a wall thereof and mounting means hinged to the bottom of such window, said variable volume body comprising front, rear and movable center panels having a common bottom edge and joined by parallel side panels, the tops of which form arcs substantially about said common edge, said rear panel being of such height as to be contiguous with the top edge of such window when the body is mounted in such container and in an open position with respect thereto.

10. A variable-volume body for use in combination with a container for free-flowing particulate solids as a metering spout for such container, such container having a window formed in a wall thereof and mounting means hinged to the bottom of such window, said variable volume body comprising front, rear and movable center panels having a common bottom edge and joined by parallel side panels, the tops of which form arcs substantially about said common edge, said rear panel being of such height as to be contiguous with the top edge of such window when the body is mounted in such container and in an open position with respect thereto, and said front panel having an adhesive disposed thereon for attaching the body to said mounting means such that the body is movable into and out of the container.

11. A metering spout as defined in claim 3 wherein said variable-volume body is composed of the same material as said container.

References Cited

UNITED STATES PATENTS

| 1,337,440 | 4/1920 | Clappison | 222—438 |
| 1,411,000 | 3/1922 | Condor | 222—364 |
| 2,019,406 | 10/1935 | Garfein | 222—364 |
| 3,187,961 | 6/1965 | Moore | 222—556 X |

ROBERT B. REEVES, Primary Examiner

N. L. STACK, JR., Assistant Examiner

U.S. Cl. X.R.

222—364